(12) United States Patent
Ung et al.

(10) Patent No.: US 10,592,928 B2
(45) Date of Patent: Mar. 17, 2020

(54) CONTENT FOR DISPLAYS BASED ON BID REQUESTS

(71) Applicant: Hewlett Packard Enterprise Development LP, Houston, TX (US)

(72) Inventors: Hang Ung, Palo Alto, CA (US); Anupriya Ankolekar, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 175 days.

(21) Appl. No.: 15/419,048

(22) Filed: Jan. 30, 2017

(65) Prior Publication Data

US 2018/0218398 A1    Aug. 2, 2018

(51) Int. Cl.
*G06Q 30/00*    (2012.01)
*G06Q 30/02*    (2012.01)

(52) U.S. Cl.
CPC ..... *G06Q 30/0255* (2013.01); *G06Q 30/0241* (2013.01); *G06Q 30/0251* (2013.01)

(58) Field of Classification Search
CPC .................................. G06Q 30/0241
USPC ......................................... 705/14
See application file for complete search history.

(56) References Cited

U.S. PATENT DOCUMENTS

| | | | |
|---|---|---|---|
| 5,740,549 A | 4/1998 | Reilly et al. | |
| 7,024,180 B2* | 4/2006 | Waters | G09F 3/00 455/412.1 |
| 7,636,456 B2 | 12/2009 | Collins et al. | |
| 2002/0094787 A1* | 7/2002 | Avnet | G06Q 30/02 455/68 |
| 2003/0037330 A1 | 2/2003 | Makofka | |
| 2007/0100688 A1 | 5/2007 | Bookl | |
| 2008/0060000 A1 | 3/2008 | Drouet et al. | |
| 2011/0166932 A1* | 7/2011 | Smith | G06Q 30/02 705/14.53 |
| 2014/0085179 A1* | 3/2014 | Krig | G06F 3/147 345/156 |
| 2014/0095306 A1* | 4/2014 | Avalos | G06Q 30/0255 705/14.53 |
| 2014/0358685 A1* | 12/2014 | Want | G06Q 30/0261 705/14.58 |
| 2015/0026574 A1* | 1/2015 | Dow | G06F 13/385 715/719 |

OTHER PUBLICATIONS

Matthew Sharifi et al, Public Display Advertising Based on Bluetooth Device Presence, Retrieved Jan. 30, 2017, 12 Pgs.

(Continued)

*Primary Examiner* — Matthew L Hamilton
(74) *Attorney, Agent, or Firm* — Hewlett Packard Enterprise Patent Department

(57) ABSTRACT

Examples include determining content for displays based on bid requests. Some examples include transmitting a probing request to a display computing device and receiving a portfolio list from the display computing device. The portfolio list may include a first identifier for a first content stored on the display computing device. Examples may also include determining a user viewing history of the first content, and transmitting a bid request to the display computing device. The bid request may indicate the user viewing history of the first content.

16 Claims, 8 Drawing Sheets

(56) References Cited

OTHER PUBLICATIONS

Nemanja Memarovic et al, Understanding Display Blindness in Future Display Deployments, Jun. 10-12, 2015, 8 Pgs.
Nicholas S. Dalton et al, Display Blindness? Looking Again at the Visibility of Situated Displays using Eye Tracking, Apr. 18-23, 2015, 10 Pgs.
Vincent Toubiana et al, Adnostic: Privacy Preserving Targeted Advertising, Mar. 2010, 21 Pgs.
Giovanni Maria Farinella et al, Face Re-Identification for Digital Signage, Oct. 30, 2014, 4 Pgs.
Nigel Davies et al, Personalization and Privacy in Future Pervasive Display Networks, CHI 2014, 2 Pgs., http://dl.acm.org/citation.cfm?id=2557287.
Aruba Networks, "KFC Free Wi-Fi for all", available online at <https://www.arubanetworks.com/assets/cs/CS_KFC.pdf>, 3 pages.
Farinella et al., "Face Re-Identification for Digital Signage Applications", 2014, 13 pages.
Lee Rainie et al., "Scenario: Workplace security and tracking", Pew Research Center, available online at <http://www.pewinternet.org/2016/01/14/scenario-workplace-security-and-tracking/>, Jan. 14, 2016, 4 pages.
Oaaa, "Digital Billboards", available online at <https://web.archive.org/web/20161023145147/https://www.oaaa.org/OutofHomeAdvertising/OOHMediaFormats DigitalBillboards.aspx>, Oct. 23, 2016, 5 pages.
Oaaa, "REsource Center—Revenue", available online at <https://web.archive.org/web/20161031183812/http://www.oaaa.org/ResourceCenter/MarketingSales/Factsamp;Figures/Revenue.aspx>, Oct. 31, 2016, 2 pages.
Wikipedia, "Coupon collector's problem", available online at <https://en.wikipedia.org/w/index.php?title=Coupon_collector%27s_problem&oldid=755076107>, Dec. 16, 2016, 7 pages.

\* cited by examiner

US 10,592,928 B2

CONTENT FOR DISPLAYS BASED ON BID REQUESTS

BACKGROUND

Signs, such as billboards and posters, may be used as a venue to reach potential consumers of a product or as a method of dispersing information to a group of people. In some examples, electronic displays may also be used to display content, such as advertisements, announcements, etc. to viewers that pass by the electronic displays. These electronic displays may be placed in public and private venues such as on roadsides, transportation hubs, retail environments, office spaces, etc.

BRIEF DESCRIPTION OF THE DRAWINGS

The following detailed description references the drawings, wherein.

DETAILED DESCRIPTION

Figure 1:
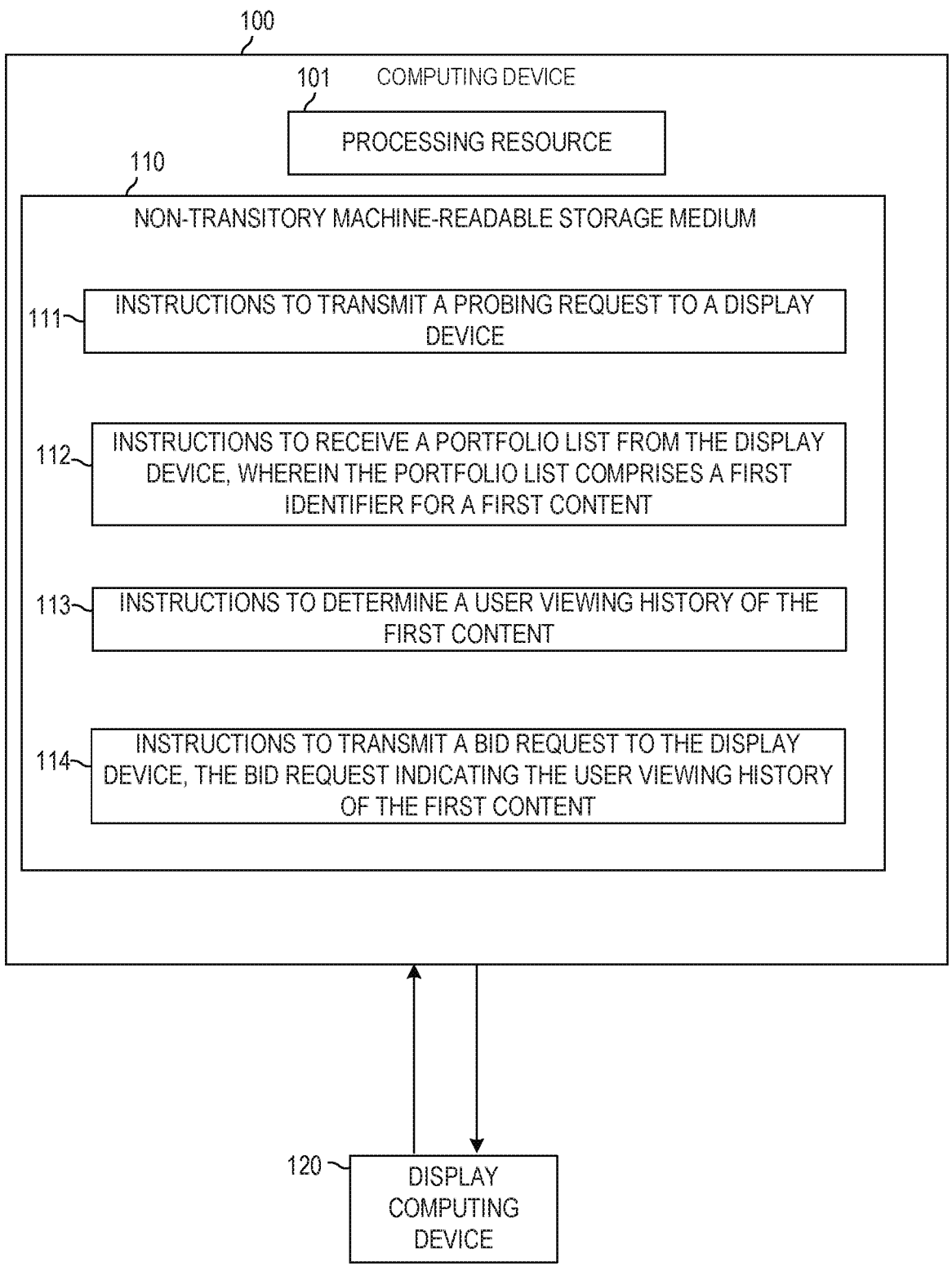
FIG. 1 is a block diagram of a computing device to transmit a bid request to a display computing device, according to some examples.

In some examples, electronic displays may be connected to a network. These networked electronic displays allow entities that use the displays to customize the information shown on the displays according to a specific physical location of the display, a specific event, etc. Despite this customizable ability, the consumer's or viewer's engagement with the electronic displays may be low. This may be because viewers do not expect to see content that is relevant to themselves. Thus, in some examples, the networked electronic display may be more effective when the content displayed is targeted or personalized to the viewers who may see the content on the display, rather than general content.

In the online word, cookies and other tracking mechanisms may be used to track individual users and their viewing history and/or behavior to present targeted content. However, the targeting or personalization of content to a specific viewer or group of viewers may lead to viewer privacy concerns. The replication of these online tracking mechanisms in the physical world pose privacy concerns because the physical tracking of an individual is not socially accepted or legal in some societies.

Examples disclosed herein allow electronic displays to customize the displayed content to proximate viewers without physically tracking the viewers or storing individual viewer data. In some examples, an electronic display and a user mobile device (e.g., a smartphone) interact with each other. When the mobile device determines that it is in the proximity of the electronic display (e.g., through a Bluetooth beacon, Wifi-based indoor position system, etc.), the mobile device may send a probing request to the electronic display. In response to the request, the electronic display sends to the mobile device a portfolio list of content that is stored on the electronic display. The mobile device compares this list to a viewed-list that is stored on the mobile device. The mobile device sends back a bid request that includes a number of times it has seen the content in the electronic display's portfolio. Based on the bid request, the electronic display determines which content in its portfolio should be displayed. Thus, examples disclosed herein allow personalized or targeting content to be displayed on the display while sheltering a viewer's privacy.

In some examples, a computing device is provided with a non-transitory machine-readable storage medium. The non-transitory machine-readable storage medium includes instructions that, when executed, cause a processing resource to transmit a probing request to a display computing device and receive a portfolio list from the display computing device. The portfolio list comprises a first identifier for a first content stored on the display computing device. The instructions also cause the processing resource to determine a user viewing history of the first content and transmit a bid request to the display computing device. The bid request indicates the user viewing history of the first content.

In some examples, a computing device is provided with a memory to store a display portfolio, the display portfolio comprising a number of content. The computing device also includes a communication engine, a response engine, and a display. The communication engine is to receive a probing request from a first requestor, transmit a number of identifiers to the first requestor in response to the probing request, and receive a first bid request from the first requestor. The number of identifiers is equal to the number of content and the first bid request indicates a first user viewing history of the display portfolio. The response engine is to determine an appropriate content out of the number of content to display based on the first bid request. The display is to display the appropriate content.

In some examples, a method is provided including determining a proximity of a display computing device, sending a probing request to the display computing device, and receiving a portfolio list from the display computing device. The portfolio list includes a first identifier for a first content stored on the display computing device. The method also includes determining a user viewing history of the first content and transmitting a bid request to the display computing device. The first bid request indicates the user viewing history of the first content.

Referring now to the figures, FIG. 1 is a block diagram of a computing device 100 to transmit a bid request to a display computing device. As used herein, a "computing device" may be a chip set, desktop computer, mobile device (e.g., smartphone, tablet computer, wireless-enabled wearable devices such as a fitness band, personal handheld device, etc.), workstation, or any other processing device or equipment. In some examples, computing device 100 may be a mobile device that interfaces with a remote computing device, such as a display computing device 120. The display computing device 120 may be a liquid crystal display, a light emitting diode display, or any other display for showing content to viewers.

Computing device 100 includes a processing resource 101 and a storage medium 110. Storage medium 110 may be in the form of a non-transitory machine-readable storage medium, such as suitable electronic, magnetic, optical, or other physical storage apparatus to contain or store information such as instructions 111, 112, 113, 114, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software (i.e. computer-readable instructions) may reside during runtime, and a secondary memory. The secondary memory can, for example, include a nonvolatile memory where a copy of software or other data is stored.

In the example of FIG. 1, instructions 111, 112, 113, and 114 are stored (encoded) on storage medium 110 and are executable by processing resource 101 to implement functionalities described herein in relation to FIG. 1. In some examples, storage medium 110 may include additional instructions, like, for example, the instructions to implement some of the functionalities described in relation to mobile device 330 of FIG. 3. In other examples, the functionalities of any of the instructions of storage medium 110 may be implemented in the form of electronic circuitry, in the form of executable instructions encoded on a machine-readable storage medium, or a combination thereof.

Processing resource 101 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 111, 112, 113, and 114 as described herein.

Instructions 111 may be executable by processing resource 101 such that computing device 100 is operative to transmit a probing request to a remote computing device, such as, for example, display computing device 120. In some examples, the probing request may be transmitted directly to display computing device 120 over a direct data connection, such as Bluetooth, WiFi, etc. In other examples, computing device 100 may transmit the probing request to the display computing device 120 indirectly over a network (not shown in FIG. 1). As used herein, a network may include a communication pathway between a first computing device and a second computing device made up of at least one intermediary computing device (e.g., a server, a network switch, a network router, etc.), at least one data linkage (e.g., electrical cable such Ethernet, optical fibers, radio waves, etc.) or a combination thereof to allow the communication and exchange of data between the first and second computing device. In some examples, and as will be described below, an intermediary computing device may be a server. In some examples, hypertext transfer protocol (HTTP) may be used for communication between the first and second computing devices and the intermediary device.

Display computing device 120 may have content stored locally thereon. The content may include advertising content, informational content, news content, or any other content suitable for display. Such content may be in different forms of media, such as video clips, pictures, words, etc. For example, one content may be a video clip advertising for a certain product. As another example, one content may be comprised of a picture and words in an informational piece. In some examples, one "content" may be the entire piece that is meant to be shown together. For example, an advertisement may be comprised of a few items, such as a background picture, and additional media items such as words, and/or additional figures overlaid on top of the background picture. The "content" may be the background picture, words, and/or additional figures as meant to be seen together, and not the individual items.

As used herein, a probing request includes a signal indicating to display computing device 120 that computing device 100 wants to know what content is stored on display computing device 120. In examples where the probing request is transmitted indirectly to the display computing device (e.g., via a server), a probing request may include data identifying the specific display computing device. For example, display computing device 120 may be one display computing device out of a universe of display computing devices. Accordingly, display computing device 120 may be associated with a unique display identifier that identifies that display in the universe of displays. The probing request may include the unique display identifier such that a server may know which display computing device to route the probing request to.

Because display computing device 120 may be one display out of a universe of display computing devices, in some examples, instructions 111 may also include instructions executable by processing resource 101 to determine a proximity of display computing device 120. As used herein, determining a proximity may include determining whether the computing device 100 is located within a threshold position in relation to display computing device 120. This allows computing device 100 to know which display computing device 120 it is closest to.

In some examples, the threshold position may be defined by the strength of a signal that is emitted by display computing device 120. For example, display computing device 120 may emit a signal on a certain radio frequency that is readable by computing device 100 once computing device 100 is within a certain distance of display computing device 120. Thus, once computing device 100 is within this distance of display computing device 120, the instructions to determine a proximity of display computing device 120 may read this signal and register that it is proximate to display computing device 120. Upon the determination of being proximate to display computing device 120, instructions 111 may transmit the probing request, as discussed above. In some examples, the signal emitted by display computing device 120 may be, but is not limited to, a Bluetooth beacon. In these examples, the Bluetooth beacon may include a beacon ID that acts as the display identifier to identify the display computing device 120.

In some examples, the threshold position may be defined by a pre-defined physical radius. For example, display computing device 120 may be located in a physical world that translates to coordinates in a positioning system on the mobile device (e.g., WiFi-based indoor positioning system, GPS, etc). The coordinates of display computing device 120 may be initially downloaded from a server and stored on computing device 100. Using the positioning system, instructions 111 may compare the current location of the computing device 100 to the stored position of display computing device 120. Upon determination that computing device 100 is within a threshold physical radius of display computing device 120, instructions 111 may determine that computing device 100 is proximate to display computing device 120 and transmit the probing request to display computing device 120.

Instructions 112 are executable by processing resource 101 such that computing device 100 receives a portfolio list from display computing device 120. As used herein, a portfolio of a display computing device may represent the entirety of the content stored on the display computing device 120. Thus, a portfolio of the display computing device 120 may include a number of content. Accordingly, as used herein, "a number" of content may refer to one content, two content, three content, etc. For example, a portfolio may include two content. In this example, "a number" equals two. As another example, a portfolio may include one content. In this example, "a number" equals one. Each content may be associated with an identifier that is unique to the content and identifies the content. In other words, a number of identifiers is equal to the number of content stored on display computing device 120. In some examples, an identifier may include an alphanumeric character.

In examples where display computing device 120 is one display computing device in a universe of display computing devices, a content that is stored on display computing device 120 may be the same as a content stored on another display computing device. In these examples, the same identifier is used for both the content stored on display computing device 120 and the content stored on the other display computing device. Thus, an identifier uniquely identifies a content in the universe of content stored on the universe of display computing devices.

As used herein, a portfolio list may represent at least a portion of the portfolio (including an entirety of the portfolio). Thus, a portfolio may have four content, while a portfolio list may have three identifiers for three content (e.g., one content in the portfolio is not represented in the portfolio list). The portfolio list may also include four identifiers where all content is represented in the portfolio list. Thus, in some examples, the portfolio list received by computing device 100 includes a first identifier for a first content stored on the display computing device 120.

Instructions 113 are executable by processing resource 101 to determine a user viewing history of the first content. In some examples, instructions 113 may include instructions to compare the first identifier (that is associated with the first content stored on display computing device 120 and received by instructions 112) with data that is stored on computing device 100 (not shown in FIG. 1.) The data stored on computing device 100 may include user viewing history data that keeps a count of how many times computing device 100 has encountered first content. For example, the user viewing history data stored on computing device 100 may include the first identifier and a count that is associated with the first identifier to signify a number of times computing device 100 has encountered the first content. In some examples, the user viewing history data may be queried for the first identifier, returning the count associated with the first identifier. Thus, for example, if computing device 100 has encountered first content 10 times before the query, the user viewing history data may include the first identifier and a count of ten associated with the first identifier. As another example, if computing device 100 has never encountered first content before, the user viewing history data may not include the first identifier. In examples described above where the portfolio list received by instructions 112 includes more than a first identifier (e.g. a second identifier, a third identifier), instructions 113 may include instructions to determine a user viewing history of all the content that is represented in the portfolio list.

Instructions 114 are executable by processing resource 101 to transmit a bid request to display computing device 120. As used herein, a bid request includes a signal indicating to display computing device 120 that computing device 100 wants display computing device 120 to display a content that is stored on display computing device 120. Similar to the probing request as described above in relation to instructions 111, the bid request may also be transmitted directly or indirectly to the display computing device 120. The bid request also includes information regarding the user viewing history of the content in the portfolio list. Thus, the bid request indicates the user viewing history of the first content. In some examples, the bid request may include the first identifier and the count associated with the first identifier. In other examples, the bid request may include all the identifiers included in the portfolio list and all of the counts associated with each identifier. Accordingly, the bid request allows the display computing device 120 to 1) know what content in its portfolio computing device 100 has already encountered; and 2) to make further determinations as to what appropriate content to display.

In some examples, display computing device 120 may already be displaying a content when computing device 100 first becomes proximate to display computing device 120. For example, display computing device 120 may have a portfolio with first content, second content, and third content and first content may be displayed when computing device 100 becomes proximate to display computing device 120. In these examples, the portfolio list received by instructions 112 may also include an indicator that first content is the content that was being displayed. For example, the first identifier may be marked to indicate to computing device 100 that first content was being displayed when computing device 100 first approached display computing device 120. This mark may distinguish the first identifier from other identifiers that may be in the portfolio list. In some examples, the portfolio list may mark the content that was displayed when the display computing device 120 receives the probing request.

In examples where display computing device 120 is currently displaying a content, instructions 112 may include instructions to increment a count of the marked identifier based on a viewing distance of the computing device 100 in relation to the display computing device 120. As used herein, a viewing distance may be equal to or less than the threshold physical radius or the signal distance used to determine the proximity of the display computing device 120 to computing device 100. For example, a viewing distance may be 5 feet while a threshold radius/signal distance may be 5 feet or greater. Accordingly, computing device 100 may be proximate to the display computing device 120 but may not be within viewing distance of display computing device 120. The viewing distance may help to determine a threshold in which a user of computing device 100 is expected to view and comprehend the contents shown on the display computing device 120. Based on the determination that the computing device 100 is equal to or less than the viewing distance away from the display computing device 120, computing device 100 may increment a count in the user viewing history data that is associated with the marked identifier. This count is included in the bid request. For example, display computing device 120 may be displaying first content when it receives a probing request from computing device 100. Display computing device 120 transmits a portfolio list which includes a first identifier for first content. The first identifier is marked to indicate that the first content was being displayed. Computing device 100 determines that it has encountered first content three times before. In the event that computing device 100 is equal to or less than the viewing distance away from the display computing device 120, computing device 100 increments the count for first identifier from three to four. Computing device 100 transmits to display computing device 120 a bid request which indicates that it has encountered first content four times.

Figure 3:
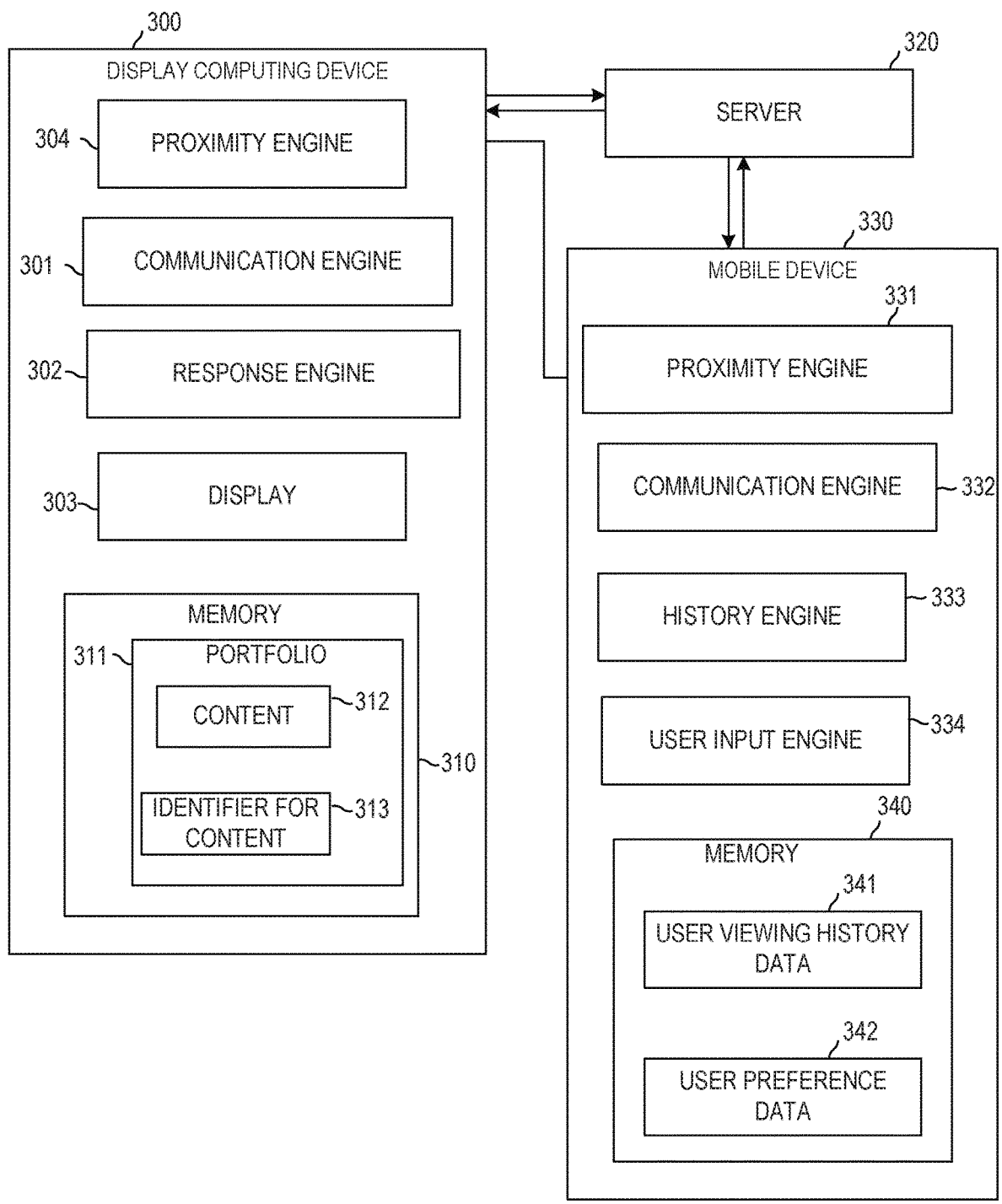
FIG. 3 is a block diagram of a mobile device and a display computing device interfacing with one another, according to some examples.

Computing device 100 of FIG. 1, which is described in terms of processors and machine-readable storage mediums, can include one or more structural or functional aspects of mobile device 330 of FIG. 3, which is described in terms of engines implemented in either hardware, software, or a combination thereof.

Figure 2:
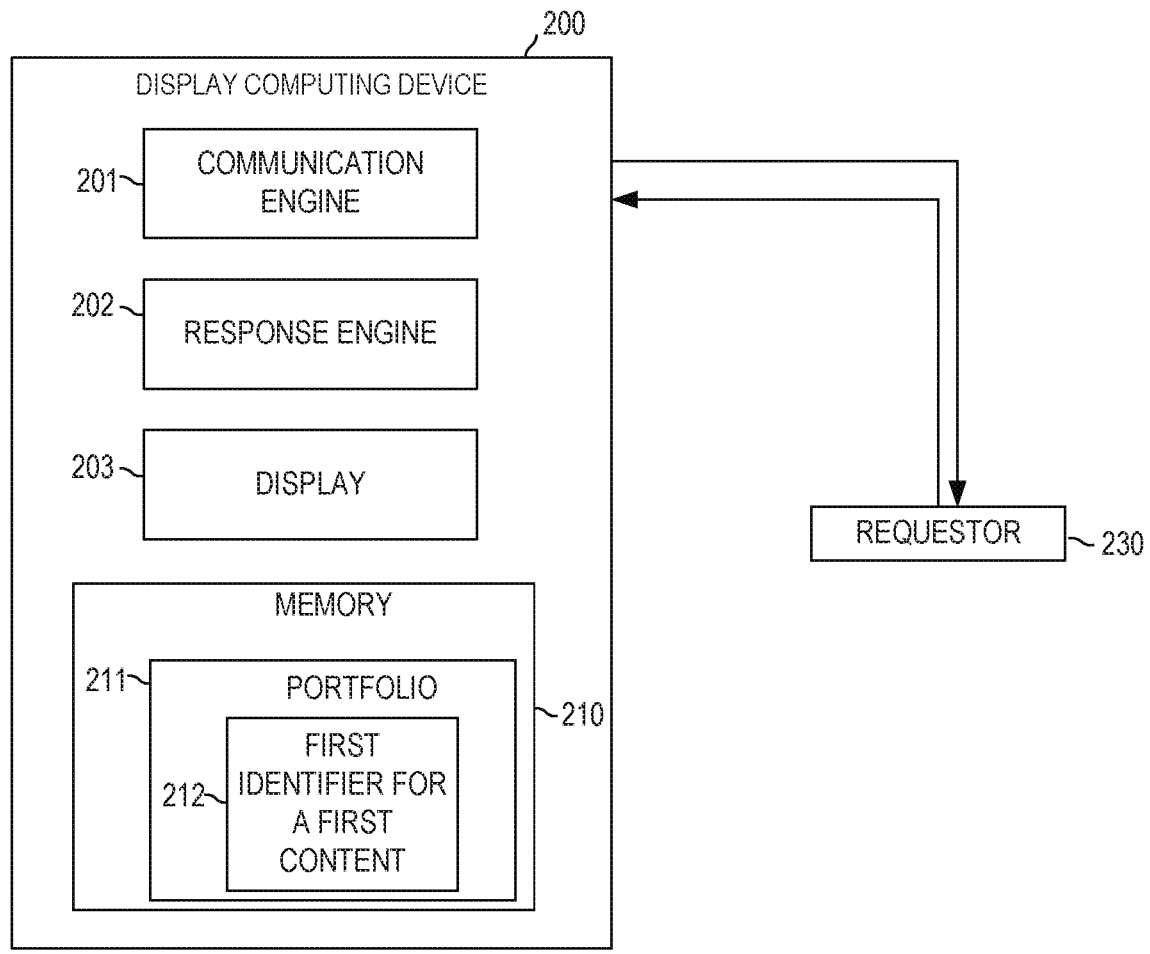
FIG. 2 is a block diagram of a display computing device to determine an appropriate content to display, according to some examples.

FIG. 2 is a block diagram of a display computing device 200 to determine an appropriate content to display. Display computing device 200 may include a server, computer networking device, chip set, desktop computer, workstation, or any other processing device or equipment with a screen to show multimedia content (e.g., an LED, LCD screen).

Display computing device 200 includes communication engine 201, response engine 202, display 203, and memory 210. Each of these aspects of computing device 200 will be described below. It is appreciated that other engines can be added to computing device 200 for additional or alternative functionality. Memory 210 may be a machine-readable storage medium of computing device 200 that is protected by hardware. In some examples, memory 210 may be implemented by Read-Only Memory (ROM) and immutable. In some examples, memory 210 may be implemented by flash (e.g., electrically erasable programmable read-only memory, EEPROM, or a combination thereof).

Each of engines 201 and 202, and any other engines, may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. Additionally, as used herein, the singular forms "a," "an," and "the" include plural referents unless the context clearly dictates otherwise. Thus, for example, the term "engine" is intended to mean at least one engine or a combination of engines. In some examples, system 200 may include additional engines.

Each engine of computing device 200 can include at least one machine-readable storage medium and at least one computer processor. For example, software that provides the functionality of engines on computing device 200 can be stored on a memory of a computer to be executed by a processor of the computer. In some examples, software that provides the functionalities of engines 201 and 202, is also stored in memory 210. This is to protect these engines and the functionalities of these engines, Memory 210 also stores a portfolio 211 of display computing device 200. As discussed above, portfolio 211 may include a number of content. Accordingly, memory 210 stores the content that may be shown by the display computing device 200. Memory 210 may also store a number of identifiers associated with the number of content. In some examples, the number of identifiers is equal to the number of content that is stored in the portfolio. For example, when memory 210 stores a portfolio with a number of content equal to 10 (e.g., 10 different ads), the number of identifiers stored is also 10, one identifier for each content. As another example, when memory 210 stores a first content, memory 210 also stores a first identifier 212 for the first content.

Communication engine 201 is an engine of computing device 200 that includes a combination of hardware and software that allows computing device 200 to receive a probing request from a requestor 230. Requestor 230 may be similar to computing device 100. In some examples, and as shown in FIG. 2, the probing request may come directly from requestor 230. In other examples, the probing request may be routed to display computing device 200 through a server (e.g., FIG. 3.) The probing request allows computing device 200 to know that a requestor is nearby. Communication engine 201 also allows computing device 200 to transmit a number of identifiers to requestor 230 in response to receiving the probing request. In some examples, the number of identifiers transmitted to requestor 230 is equal to the number of content stored in portfolio 210.

Communication engine 201 also allows computing device 200 to receive a bid request from requestor 230. The bid request indicates a user viewing history of the portfolio 210. Thus, in the example above where the portfolio has ten content, the bid request indicates to the communication engine 201 a user viewing history of each of the ten content in the portfolio. In some examples, the bid request may include the same ten identifiers that was transmitted to requestor 230 associated with a count for each of the ten identifiers. The count for each identifier may indicate how many times requestor 230 has encountered each content. In some examples, communication engine 201 may implement protocols such as the transmission control protocol (TCP) or Internet protocol (IP) to transmit and receive the probing request, portfolio list, and bid request.

Response engine 202 is an engine of display computing device 200 that includes a combination of hardware and software that allows display computing device 200 to determine an appropriate content out of the number content in display computing device 200 to display. The appropriate content is determined based, at least in part, on the bid request. For example, display computing device 200 may have a portfolio with a total of ten content. Each content is associated with a unique identifier: C1, C2, C3, C4, C5, C6, C7, C8, C9, and C10. The bid request from requestor 230 may indicate that requestor 230 has encountered C1 one time, C2 three times, C3 three times, C4 five times, C5 three times, C6 zero times, C7 three times, C8 five times, C9 six times, and C10 two times. Based on this bid request, response engine 202 may determine that the appropriate content to display is the content associated with identifier C6 because requestor 230 has never encountered the content associated with identifier C6 before.

Display 203 is an electronic screen of display computing device 200 that allows display computing device 200 to display the appropriate content. Non-limiting examples of display 203 may include a cathode ray tube, liquid crystal display, flat panel display, light emitting diode display, etc.

In some examples, display computing device 200 may have a content displayed on display 203 when a probing request is received by communication engine 201. In these examples, communication engine 201 may allow display computing device 200 to transmit a number of identifiers, with one identifier marked to indicate to requestor 230 the content that was being shown on display 203 at the time the probing request was received. For example, the identifier that is associated with the content currently being shown on display 203 may be marked with a special character such as an asterisk.

Display computing device 200 of FIG. 2 can include one or more structural or functional aspects of display computing device 300 of FIG. 3.

FIG. 3 shows a block diagram of a display computing device 300 indirectly transmitting information with mobile device 330 via server 320.

Display computing device 300 includes communication engine 301, response engine 302, display 303, proximity engine 304, and memory 310. Communication engine 301 has similar functionalities as communication engine 201, except that communication engine 301 receives the probing request and the bid request indirectly from mobile device 330 through server 320 and transmits a number of identifiers to mobile device 330 through server 320. In other words, server 320 may route information to and from display computing device 300 and mobile device 330. In some examples, server 320 is remotely located from both display computing device 300 and mobile device 330.

Response engine 302 has similar functionalities as response engine 202, except that response engine 302 may determine an appropriate content based on the bid request and user preferences, as will be discussed herein in relation to user input engine 334. Display 303 has similar functionalities as display 203.

Memory 310 may be in a similar format as memory 210. Memory 310 may store a portfolio 311. Portfolio 311 may include a number of content 312 and a number of identifiers 313 for the content 312, with one identifier for each content.

Display computing device 300 also includes proximity engine 304. In some examples, proximity engine 304 is an engine of display computing device 300 that allows display computing device 300 to emit a signal that is readable by mobile device 330 once mobile device 330 is within a certain distance of display computing device 300. In some examples, the signal may be on a certain radio frequency. Non-limiting examples of the types of signals emitted by proximity engine 304 may be a Bluetooth beacon. In these examples, the Bluetooth beacon may include a beacon ID that identifies the display computing device 300 to the mobile device 330. Accordingly, in these examples, display computing device 300 emits this signal which is directly received by mobile device 330 and is not relayed via server 320.

In some examples, proximity engine 304 is an engine of display computing device 300 that allows display computing device 300 to translate its physical location into coordinates on a positioning system. Proximity engine 304 may transmit these coordinates to server 320, which may then provide them to mobile device 330. Mobile device 330 may be able to translate the coordinates back to a physical location using a positioning system in order to determine when it is proximate to display computing device 300. In these examples, the coordinates are routed to mobile device 330 through server 320.

Display computing device 300 of FIG. 3 can include one or more structural or functional aspects of display computing device 200 of FIG. 2.

Server 320 may be a computing device that is able to receive information from both the display computing device 300 and mobile device 330 and route the information to the other. Server 320 may be connected to display computing device 300 and mobile device 330 with a network, as discussed above.

Mobile device 330 includes a proximity engine 331, a communication engine 332, a history engine 333, a user input engine 334, and a memory 340. As used herein, a mobile device may include a computing device that is portable by the user of the computing device. Non-limiting examples include a cell phone, a smart phone, a laptop, a wearable device such as a smart watch, fitness tracker, smart glasses, a tablet, etc.

Proximity engine 331 is an engine of mobile device 330 that allows mobile device 330 to determine a proximity of itself to display computing device 300. As discussed above, in some examples, proximity engine 304 of display computing device 300 may emit a signal on a certain radio frequency. In these examples, this signal is readable by proximity engine 331 when mobile device 330 is within a certain distance of display computing device 300. Accordingly, when mobile device 330 is within this certain distance, proximity engine 331 may read the signal emitted by proximity engine 304 and determine that mobile device 330 is proximate to the display computing device 300. Communication engine 332 of mobile device 330 may then transmit a probing request, as will be discussed below. In some examples display computing device 300 is one display computing device among many display computing devices. Accordingly, the signal emitted by proximity engine 304 is associated with a display ID which identifies display computing device 300. The display ID is included by communication engine 332 in its probing request so that server 320 knows which display computing device to route the probing request to. As discussed above, in some examples, the signal emitted by proximity engine 304 may be a Bluetooth beacon. In these examples, the display ID may be a beacon ID.

As also discussed above, in some examples, proximity engine 304 of display computing device 300 does not emit a signal but instead transmits a coordinate position to server 320. These coordinates may translate to the physical location of display computing device 300. Server 320 may provide these coordinates to mobile device 330 (e.g. through an initial download of the coordinates) and these coordinates may be stored on mobile device 330. In these examples, proximity engine 331 of mobile device 330 may include a positioning system that determines a current physical location of mobile device 330 based on the stored coordinates and compares the current location to the coordinates of display computing device 300. Upon a determination that mobile device 330 is within a threshold radius of display computing device 300, proximity engine 331 may determine that mobile device 330 is proximate to display computing device 300. Accordingly, communication engine 332 may transmit a probing request to server 320. In these examples, the probing request may include a display ID to identify the display computing device 300 such that server 320 knows which display computing device to route the probing request to.

In some examples, proximity engine 331 may monitor for a proximate display computing device only when specific conditions are met. For example, a user of mobile device 330 may set preferences such that proximity engine 331 is not monitoring for a proximate display computing device during specific hours of the day (e.g., 9 AM to 5 PM when the user is unlikely to be near a display computing device). As another example, a user of mobile device 330 may set preferences such that proximity engine 331 is monitoring for a proximate display computing device during movement of the mobile device and does not monitor when the mobile device 330 is still for a certain period of time. These conditions may help preserve the battery of mobile device 330 and the preferences may be stored in user preference data 342 in memory 340 of mobile device 330.

Communication engine 332 is an engine of mobile device 330 that allows mobile device 330 to transmit a probing request to display computing device 300. A probing request, as discussed above in relation to instructions 111, is applicable here. The probing request may include a display ID such that server 320 may know which display computing device to route the probing request to. Communication engine 332 also allows mobile device 330 to receive (indirectly from display computing device 300) a number of identifiers that represents the number of content stored in portfolio 311 of display computing device 300. Additionally, communication engine 332 allows mobile device 330 to transmit a bid request indirectly to display computing device 300 via server 320. A bid request, as discussed above, is applicable here. The bid request may include a display ID such that server 320 may know which display computing device to route the bid request to. As discussed above and further below, the bid request may indicate a user viewing history of the content stored by display computing device 300. In some examples, communication engine 332 may implement protocols such as the transmission control protocol (TCP) or internet protocol (IP) to transmit and receive the probing request, the number of identifiers, and the bid request.

History engine 333 is an engine of mobile device 330 that allows mobile device 330 to determine a user viewing history of the content 312 stored in memory 310 of display computing device 300. For example, history engine 333 may interface with user viewing history data 341 stored in memory 340 of mobile device 330. User viewing history data 341 may include identifiers associated with all the content that mobile device 330 has encountered and a count for each identifier. In some examples, history engine 333 may query user viewing history data 341 for the count associated with each identifier that is received by communication engine 332. The count for each identifier is included in the bid request sent by communication engine 332 back to display computing device 300. In some examples, the bid request includes the count for each identifier that is sent to mobile device 330 by display computing device 300 but not the count for every identifier that is stored in user viewing history data 341. For example, user viewing history data 341 may have a count for identifiers C1, C2, and C3. However, display computing device 300 may only transmit two identifiers, C1, and C3, to mobile device 330. This indicates that display computing device 300 has the content associated with C1 and C3 stored in its memory 310, but not the content associated with C2. In the bid request back to display computing device 300, mobile device 330 may send the count associated with C1 and C3 and not the count associated for C2. This further ensures that display computing device 300 does not receive more information than it needs to determine the appropriate content to display on its display 303 and helps to protect user privacy.

User input engine 334 is an engine of mobile device 330 that allows mobile device 330 to capture certain user preferences including the categories of content that the user is interested in, the proximity monitoring preferences of the proximity engine 331, etc. User input engine 334 may be directly connected to mobile device 330 or remote from but in communication with mobile device 330. Non-limiting examples of user input engine 334 may be a keyboard, touchpad, touchscreen, dial, mouse, etc. These user preferences may be inputted into the mobile device 330 via user input engine 334 and stored in user preference data 342 in memory 340 of mobile device 330.

As discussed above, a user preference may include topics of interest that the user is interested in. For example, the user may indicate that they are interested in sports. In some examples, this topic of interest (sports) is included in the bid request that communication engine 332 transmits to display computing device 300. Correspondingly, response engine 302 may determine an appropriate content based, at least in part, on this topic of interest. For example, display computing device 300 may have one content out of five that is related to sports. Display computing device 300 (response engine 302) may determine that the appropriate content is the one content that is related to sports.

In some examples, response engine 302 may determine an appropriate content to display based, at least in part, on the topic of interest and the user viewing history. For example, response engine 302 may determine a score for each identifier using the formula:

$$S_i = (w_{topic} \times K_i - w_{seen} \times N_i) \quad \text{(Eq. 1)}$$

where $w_{topic}$ is a weight for the topic of interest, $w_{seen}$ is a weight for the user viewing history, $i$ represents the identifier, $N_i$ is the count for how many times the mobile device 330 has encountered the content associated with identifier $i$, and $K_i$ is equal to 1 if i belongs to a topic of interest and 0 if it does not. Response engine 302 may determine that the appropriate content is the content associated with the identifier with the highest S score. In examples where a topic of interest is used, each content that is stored on the display computing device 300 may be assigned to certain topics. For example, an ad featuring playing tennis on a resort spa may be assigned to a sport topic and to a traveling topic. The $K_i$ for this ad may be 1 in situations where the user has indicated that they are interested in sports and/or traveling.

Mobile device 330 of FIG. 3, which is described in terms of engines containing hardware and software, can include one or more structural or functional aspects of computing device 100 of FIG. 1, which is described in terms of processors and machine-readable storage mediums.

Figure 4:
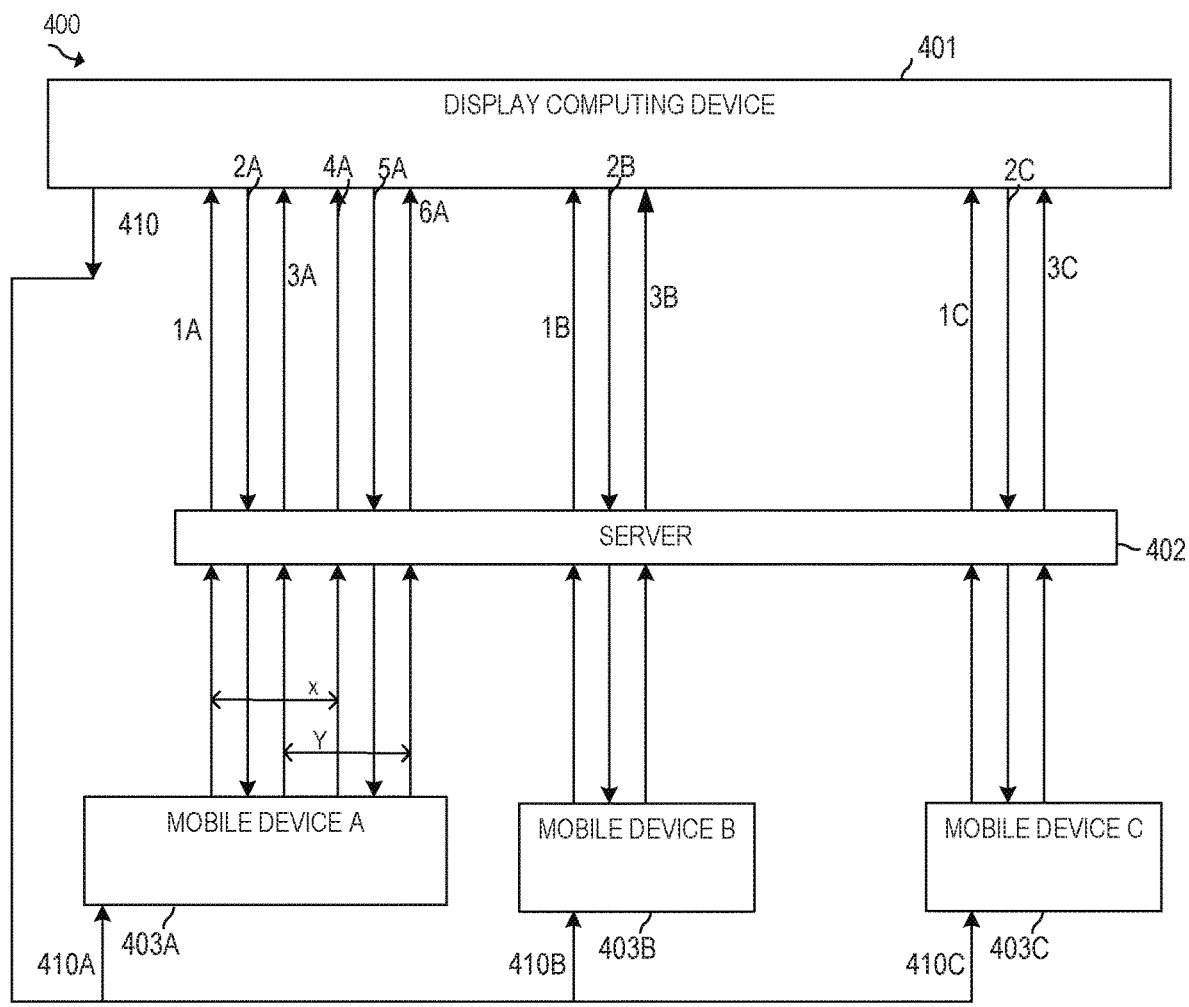
FIG. 4 is a block diagram of a display computing device, a server, and a variety of mobile devices interfacing with each other, according to some examples.

FIG. 4 shows a block diagram of the communications between a display computing device 401, a server 402, and multiple mobile devices 403A, 403B, 403C in a network 400. While FIG. 4 shows a specific number of devices, network 400 may include more or less devices than shown.

Display computing device 401 may be located at a physical location and is not moving. Display computing device 401 may include the engines as described in relation to display computing device 200 in FIG. 2 or the engines as described in relation to display computing device 300 in FIG. 3. Display computing device 401 may emit a signal 410 that is readable on a certain radio frequency. In some examples, this signal 410 may be a Bluetooth beacon. Each of mobile devices 403A, 403B, and 403C may include the instructions as described in relation to FIG. 1 or the engines as described in relation to mobile device 330 in FIG. 3. Each of mobile devices 403A, 403B, 403C may all enter a range where the mobile devices may read signal 410. For example, display computing device 401 may be located in a shopping mall, and mobile devices 403A, 403B, 403C may all pass within a range where each mobile device may read the Bluetooth beacon emitted by display computing device 401.

Each mobile device 403A, 403B, 403C reads the signals 410A, 410B, 410C, and each determines that display computing device 401 is proximate. Mobile device 403A transmits a probing request 1A that is routed by server 402 to display computing device 401A. Mobile device 403B transmits a probing request 1B that is routed by server 402 to display computing device 401. Mobile device 403C transmits a probing request 1C that is routed by server 402 to display computing device 401. In response to probing request 1A, display computing device 401 transmits a response 2A that includes a number of identifiers representing the portfolio stored on display computing device 401. Response 2A is routed to mobile device 403A by server 402. Likewise, display computing device 401 may send similar responses 2B and 2C to mobile device 403B and mobile device 403C, respectively. Those responses 2B and 2C may also be routed by server 402. In some examples, and not shown in FIG. 4, display computing device 401 does not send responses 2B and 2C to server 402 because it has just sent response 2A. Server 402 may know to send response 2A to both mobile device 403B and mobile device 403C. This may be done in order to increase efficiency in communication.

Mobile device 403A determines its user viewing history in response to receiving response 2A. Mobile device 403B and mobile device 403C likewise do the same. Mobile device 403A sends a bid request 3A, which indicates its user viewing history of the content stored in display computing device 401. Mobile device 403B sends a bid request 3B, which indicates mobile device 403B's user viewing history of the content stored in display computing device 401. Mobile device 403C sends a bid request 3C, which indicates mobile device 403C's user viewing history of the content stored in display computing device 401. Bid requests 3A, 3B, and 3C are routed to display computing device 401 via server 402.

Based on bid requests 3A, 3B, and 3C, display computing device 401 may determine an appropriate content to display on its display. In some examples, display computing device 401 may aggregate all the counts for each identifier across all the mobile devices, and display the content that is associated with the identifier with the lowest count. For example, display computing device 401 may have content associated with identifier C1 and content associated with identifier C2. Mobile device 403A has encountered C1 one time and C2 one time. Mobile device 403B has encountered C1 three times and C2 one time. Mobile device 403C has encountered C1 one time and C2 two times. C2 thus has the lowest aggregated count. Accordingly, display computing device 401 determines to display content associated with identifier C2.

In some examples, the mobile devices 403A, 403B, and 403C may have user preferences, such as topics of interest, that are included in the bid requests 3A, 3B, and 3C. In these examples, display computing device 401 may determine an appropriate content based on the user viewing histories and the topics of interest. Display computing device 401 may determine an aggregate sum across the mobile devices 403A, 403B, and 403C for each identifier, using the formula:

$$S_i = \text{sum}(w_{topic} \times K_i - w_{seen} \times N_i)$$ (Eq. 2)

where $w_{topic}$ is a weight for the topic of interest, $w_{seen}$ is a weight for the user viewing history, $_i$ represents the identifier, $N_i$ is the count for how many times the mobile device X has encountered the content associated with identifier $_i$, and $K_i$ is equal to 1 if i belongs to a topic of interest of the mobile device X and 0 if it does not. Display computing device 401 may determine that the appropriate content is the content associated with the identifier with the highest aggregate score across all the mobile devices. For example, display computing device may have content associated with identifier C1 and content associated with identifier C2. Mobile device 403A may have a score of 5 for identifier C1 and a score of 2 for identifier C2. Mobile device 403B may have a score of 3 for identifier C1 and a score of 6 for identifier C2. Mobile device 403C may have a score of 3 for identifier C1 and a score of 1 for identifier C2. Thus, C1 has the highest aggregate score. Accordingly, display computing device 401 determines to display content associated with identifier C1.

After display computing device 401 displays content associated with identifier C1, mobile device 403B and mobile device 403C may move such that they are no longer proximate to display computing device 401. For example, the users of mobile device 403B and mobile device 403C may have left the mall or entered a store located far away from display computing device 401. Mobile device 403A, however, may remain proximate to display computing device 401. Mobile device 403A may start the cycle over by sending a new probing request 4A. Display computing device 401 may respond with a number of identifiers 5A, and mobile device 403A transmits a new bid request 6A.

In some examples, a new probing request 4A is made after a certain time interval X has passed since the previous probing request. In some examples, a new bid request 6A is made after a certain time interval Y has passed since the previous bid request. These time intervals may be set by a user preference and may set to prevent a mobile device overloading the display computing device with too many requests.

Although specific functionalities of computing device 100 and mobile device 330 have been described as being included in mobile devices 403A, 403B, and 403C, mobile devices 403A, 403B, and 403C may include additional functionalities described in relation to computing device 100 and mobile device 330. Although specific functionalities of display computing device 300 and display computing device 200 have been described as being included in display computing device 401, display computing device 401 may include additional functionalities described in relation to display computing device 300 and display computing device 200.

Figure 5:
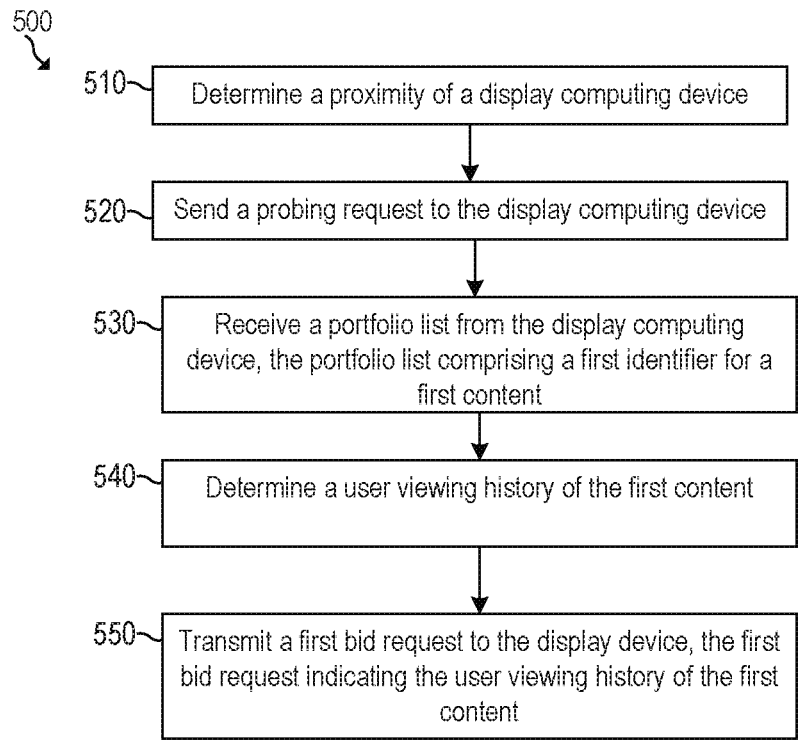
FIG. 5 is a flowchart of a method of sending a bid request to a proximate display computing device, according to some examples.

FIG. 5 illustrates a flowchart for a method 500 to send a bid request to a proximate display computing device. Although execution of method 500 is described below with reference to mobile device 330 of FIG. 3, other suitable devices for execution of method 500 can be utilized (e.g. computing device 100 of FIG. 1 or mobile devices 403A-403C of FIG. 4). Additionally, implementation of method 500 is not limited to such examples and it is appreciated that method 500 can be used for any suitable device or system described herein or otherwise.

At 510 of method 500, proximity engine 331 determines a proximity of display computing device 300. As described above, in some examples, this may be done via direct communication between display computing device 300 and mobile device 330 using Bluetooth. At 520 communication engine 332 sends a probing request to the display computing device 300. In some examples, this may be done indirectly via server 320. At 530, communication engine 332 receives a portfolio list from the display computing device 300. The portfolio list may include a first identifier for a first content that is stored on memory 310 of display computing device 300. At 540 of method 500, history engine 333 determines a user viewing history of the first content. This may be accomplished, in some examples, by the history engine 333 querying user viewing history data 341 stored on memory 340 of mobile device 330. At 550 of method 500, communication engine 332 transmits a bid request to the display computing device via server 320. The bid request may indicate the user viewing history of the first content.

Although the flowchart of FIG. 5 shows a specific order of performance of certain functionalities, method 500 is not limited to that order. For example, some of the functionalities shown in succession in the flowchart may be performed in a different order, may be executed concurrently or with partial concurrence, or a combination thereof.

Figure 6:
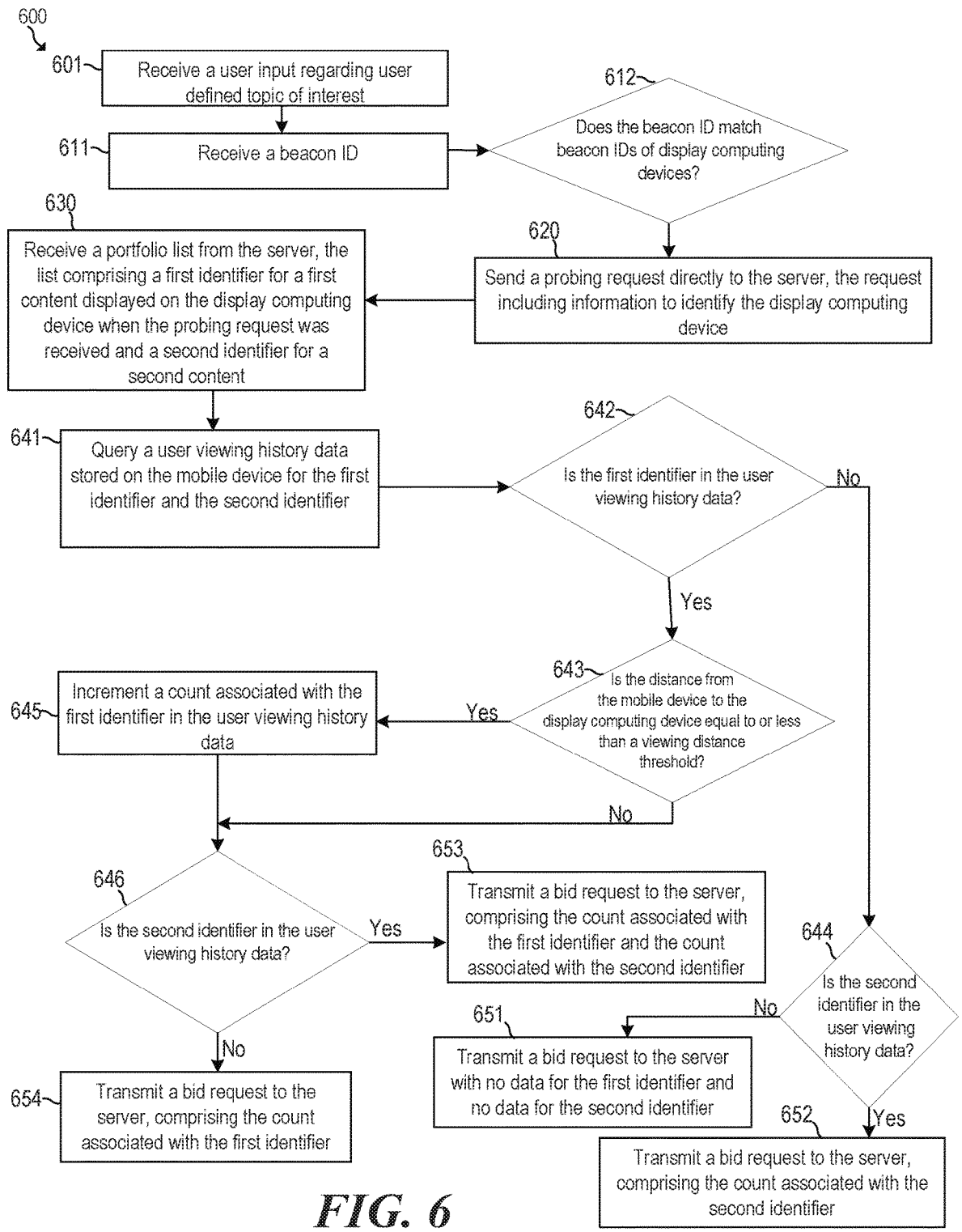
FIG. 6 is a flowchart of a method of sending a bid request to a proximate display computing device, according to some examples.

FIG. 6 illustrates a flowchart for a method 600 to send a bid request to a proximate display computing device. Although execution of method 600 is described below with reference to mobile device 330 of FIG. 3, other suitable devices for execution of method 600 can be utilized (e.g. computing device 100 of FIG. 1 or mobile devices 403A-403C of FIG. 4). Additionally, implementation of method 600 is not limited to such examples and it is appreciated that method 600 can be used for any suitable device or system described herein or otherwise.

At 601 of method 600, user input engine 334 may receive a user input with regard to user preferences. In some examples, the user preferences may include a user defined topic of interest. The user preferences received in 601 may be stored in user preference data 342 in memory 340 of mobile device 330. At 611 of method 600, proximity engine 331 receives a Bluetooth beacon ID. This Bluetooth beacon ID may be a beacon ID that is emitted by a device using the Bluetooth protocol. Mobile device 330 does not yet know whether the beacon ID is for display computing device 300. At 612 of method 600, proximity engine 331 may determine whether the beacon ID received in 611 matches a beacon ID of a display computing device. That is, mobile device 330 may have stored in its memory a list of beacon IDs for the universe of display computing devices. Upon determination that the received beacon ID matches one of the IDs in the list, mobile device 330 may determine that it is proximate to a display computing device to which it may transmit a probing request.

At 620 of method 600, communication engine 332 sends a probing request directly to server 320. The probing request may include information to identify the specific display computing device 300 to the server 320 such that server 320 knows where to route the probing request to. As discussed above, the information may include the beacon ID. At 630 of method 600, communication engine 332 receives a portfolio list from server 320. The list may include a first identifier for a first content and a second identifier for a second content. The first content and the second content are stored on memory 310 of display computing device 300. The first content may also be what was displayed on display computing device 300 when the probing request was received by the display computing device 300. Accordingly, the first identifier may be marked as to specifically differentiate it as being associated to the content that was being displayed at the time the probing request was received.

At 641 of method 600, history engine 333 may query the user viewing history data 342 stored on mobile device 330 for the first identifier and the second identifier. At 642 of method 600, history engine 333 determines whether the first identifier is present in the user viewing history data. Upon a determination that the first identifier is present in the user viewing history data, method 600 moves to 643. At 643, history engine 333 determines whether the distance from mobile device 330 to the display computing device 300 is equal to or less than a viewing distance threshold. Upon a determination that the distance is equal to or less than a viewing distance threshold, method 600 moves to 645. At 645, history engine 333 increments a count associated with the first identifier in the user viewing history data. This is because history engine 333 has determined that the mobile device 330 is close enough to view the content that was being displayed at the time the probing request was received by the display computing device 300. Upon a determination that the distance is not equal to or less than a viewing distance threshold, method 600 moves to 646. At 646, history engine 333 determines whether the second identifier is present in the user viewing history data. Upon a determination that the second identifier is present, method 600 moves to 653. At 653, communication engine 332 transmits a bid request to server 320, comprising a count associated with the first identifier and a count associated with the second identifier. Upon a determination that the second identifier is not present, method 600 moves to 654. At 654, communication engine 332 transmits a bid request to server 320, comprising a count associated with the first identifier.

As discussed above, at 642, history engine 333 determines whether the first identifier is present in the user viewing history data. Upon a determination that the first identifier is not present, method 600 moves to 644. At 644, history engine 333 determines whether the second identifier is present in the user viewing history data. Upon a determination that the second identifier is present, method 600 moves to 652. At 652, communication engine 332 transmits a bid request to server 320, comprising the count associated with the second identifier. Upon a determination that the second identifier is not present, method 600 moves to 651. At 651, communication engine 332 transmits a bid request to server 320. The bid request does not have any data for the first identifier and does not have any data for the second identifier. Display computing device 300 may interpret this as the mobile device never encountering either the content associated with the first identifier or the content associated with the second identifier.

Although the flowchart of FIG. 6 shows a specific order of performance of certain functionalities, method 600 is not limited to that order. For example, some of the functionalities shown in succession in the flowchart may be performed in a different order, may be executed concurrently or with partial concurrence, or a combination thereof.

Figure 7:
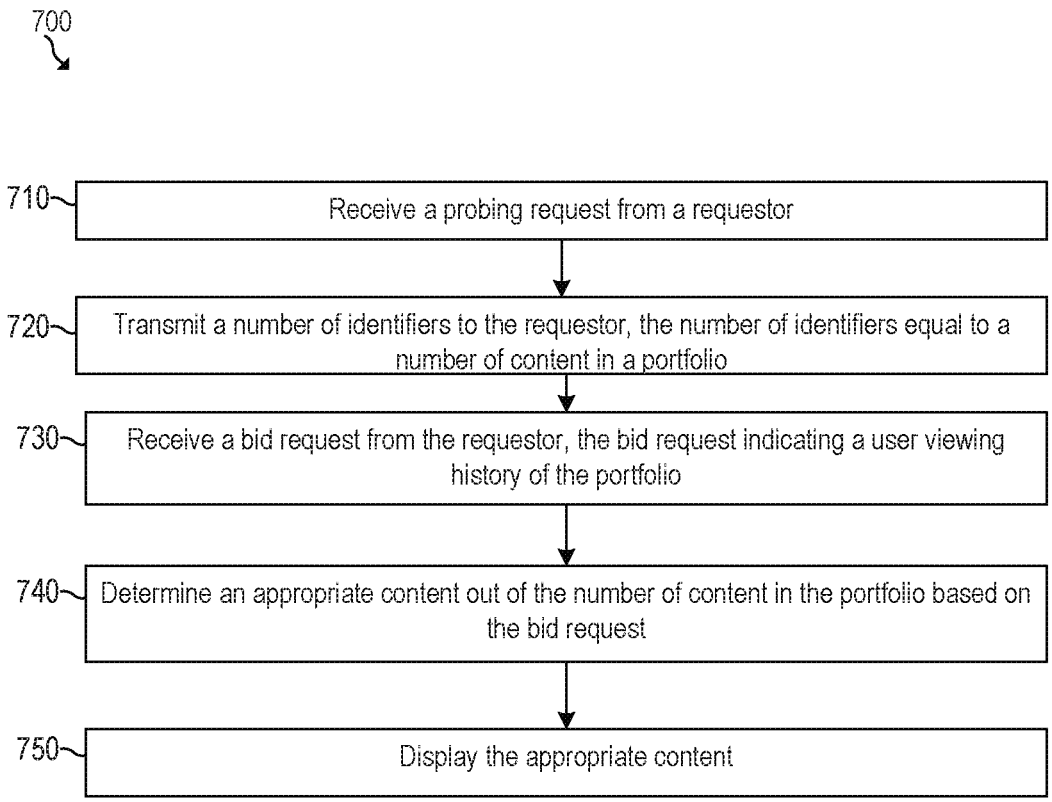
FIG. 7 is a flowchart of a method of determining an appropriate content to display based on a bid request, according to some examples.

FIG. 7 illustrates a flowchart for a method to determine an appropriate content to display. Although execution of method 700 is described below with reference to display computing device 200 of FIG. 2, other suitable devices for execution of method 700 can be utilized (e.g. display computing device 300 of FIG. 3 or display computing device 400 of FIG. 4). Additionally, implementation of method 700 is not limited to such examples and it is appreciated that method 700 can be used for any suitable device or system described herein or otherwise.

At 710 of method 700, communication engine 201 receives a probing request from a requestor 230. Requestor 230 may be a mobile device. At 720 of method 700, communication engine may transmit a number of identifiers to the requestor, the number of identifiers equal to a number of content in a portfolio 210 that is stored in memory 210 of display computing device 200. In some examples, memory 210 has a first content and a first identifier for a first content.

At 730 of method 700, communication engine 201 receives a bid request from requestor 230. The bid request may indicate a user viewing history of the content in the portfolio. At 740 of method 700, response engine 202 may determine an appropriate content out of the number of content stored in memory 210 based, at least in part on, the bid request received at 730. At 750, display 203 may display the appropriate content.

Although the flowchart of FIG. 7 shows a specific order of performance of certain functionalities, method 700 is not limited to that order. For example, some of the functionalities shown in succession in the flowchart may be performed in a different order, may be executed concurrently or with partial concurrence, or a combination thereof.

Figure 8:
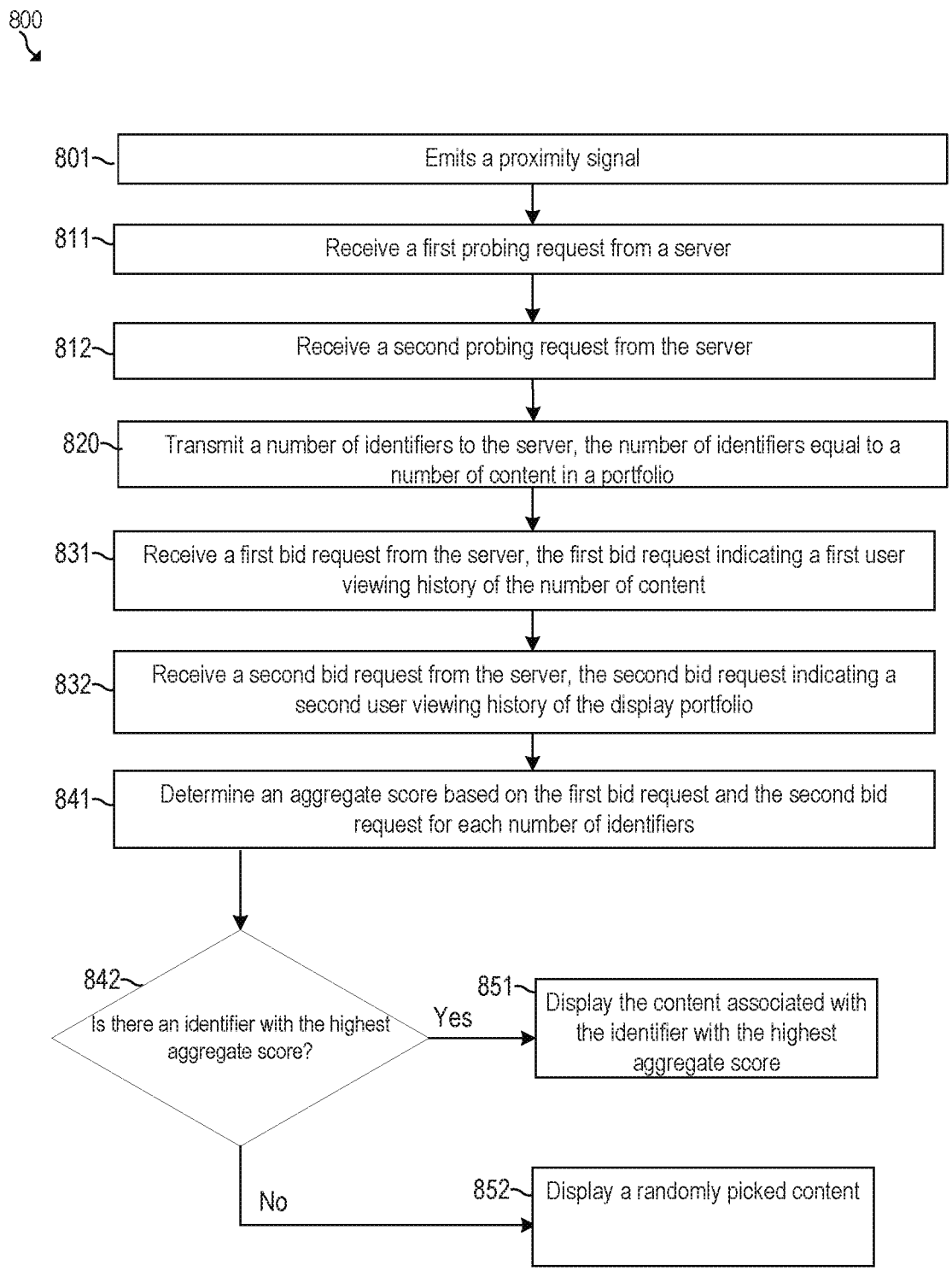
FIG. 8 is a flowchart of a method of determining an appropriate content to display based on multiple bid requests, according to some examples.

FIG. 8 illustrates a flowchart for a method 800 to determine an appropriate content to display based on multiple bid requests. Although execution of method 700 is described below with reference to display computing device 300 of FIG. 3, other suitable devices for execution of method 800 can be utilized (e.g. display computing device 200 of FIG. 2 or display computing device 400 of FIG. 4). Additionally, implementation of method 800 is not limited to such examples and it is appreciated that method 800 can be used for any suitable device or system described herein or otherwise.

At 801 of method 800, proximity engine 304 emits a proximity signal. As discussed above, in some examples, this may be a signal on a certain radio frequency (e.g., Bluetooth). At 811 of method 800, communication engine 301 receives a first probing request from server 320. This first probing request is routed from a first mobile device (e.g. mobile device 330) by server 320. At 812 of method 800, communication engine 301 receives a second probing request from server 320. This second probing request is routed from a second mobile device (e.g. a mobile device not shown in FIG. 3). At 820, communication engine 301 transmits a number of identifiers to server 320. The number of identifiers may be equal to a number of content that is stored in memory 310 of display computing device 300. Server 320 may route the identifiers to the first mobile device and to the second mobile device. At 831 of method 800, communication engine 301 receives a first bid request from the server 320. This is sent by the first mobile device and routed to display computing device 300 by server 320. The first bid request may indicate a first user viewing history of the number of content in the portfolio 311. At 832 of method 800, communication engine 301 receives a second bid request from the server 320. This is sent by the second mobile device and routed to display computing device 300 by server 320. The second bid request may indicate a second user viewing history of the number of content in portfolio 311. At 841, response engine 302 may determine an aggregate score based, at least in part, on the first bid request and the second bid request. In some examples, the aggregate score may be determined using equation 2 as discussed above. One aggregate score may be determined for each identifier. At 842 of method 800, response engine 302 determines whether there is an identifier with the highest aggregate score. Upon a determination that there is an identifier with the highest aggregate score, method 800 moves to 851. At 851, display 303 displays the content associated with the identifier that has the highest aggregate score. Upon a determination that there is not an identifier with a highest aggregate score, method 800 moves to 852. At 852, display 303 displays a randomly picked content out of the number of content 312 in portfolio 311.

Although the flowchart of FIG. 8 shows a specific order of performance of certain functionalities, method 800 is not limited to that order. For example, some of the functionalities shown in succession in the flowchart may be performed in a different order, may be executed concurrently or with partial concurrence, or a combination thereof.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A non-transitory machine-readable storage medium comprising instructions, that, when executed, cause a processing resource to:
   determine, by a mobile device, a proximity between the mobile device and a first display computing device of a plurality of display computing devices based on a signal received from the first display computing device;
   transmit, by the mobile device and in response to a determination that the proximity is within a proximity threshold distance, a probing request to the first display computing device;
   receive, by the mobile device and in response to the probing request, a portfolio list from the first display computing device, wherein the portfolio list comprises a plurality of identifiers and an indicator, each of the plurality of identifiers representing one of a plurality of content stored on the first display computing device, and the indicator representing a current content being displayed by the first display computing device at a time of the determination that the proximity between the mobile device and the first display computing device was within the proximity threshold distance;
   determine, by the mobile device, a view count for each of the plurality of identifiers, wherein the view count for an identifier denotes a number of times the mobile device has moved from a location beyond to a location within a viewing threshold distance of any display computing device of the plurality of display computing devices while the content associated with the identifier was being displayed on such display computing device, and wherein the viewing threshold distance is less than the proximity threshold distance;
   increment, by the mobile device and in response to a determination that the current content is being displayed by the first display computing device at the time the mobile device moved from the location beyond to the location within the viewing threshold distance of the first display computing device, a view count for the identifier corresponding to the indicator by one additional count;
   transmit, by the mobile device, based on the received portfolio list, a bid request to the first display computing device, the bid request indicating the view count for each of the plurality of identifiers including the incremented view count for the identifier corresponding to the indicator representing the current content; and
   wherein the first display computing device does not track and store a physical location of an individual user of the mobile device.

2. The storage medium of claim 1, wherein the bid request indicates a user topic of interest.

3. The storage medium of claim 1, further comprising:
   instructions to query a database of user viewed content, wherein the database of user viewed content comprises each identifier for each content displayed on a display computing device while the mobile phone was detected to have moved from a location beyond to a location within the viewing threshold distance of a display computing device.

4. A method comprising:
determining, by a mobile device, a proximity between the mobile device and a first display computing device of a plurality of display computing devices based on a signal received from the first display computing device;
sending, by the mobile device and in response to a determination that the proximity is within a proximity threshold distance, a probing request to the first display computing device;
receiving, by the mobile device and in response to the probing request, a portfolio list from the first display computing device, wherein the portfolio list comprises a plurality of identifiers and an indicator, each of the plurality of identifiers representing one of a plurality of content stored on the first display computing device, and the indicator representing a current content being displayed by the first display computing device at a time of the determination that the proximity between the mobile device and the first display computing device was within the proximity threshold distance;
determining, by the mobile device, a view count for each of the plurality of identifiers, wherein the view count for an identifier denotes a number of times the mobile device has moved from a location beyond to a location within a viewing threshold distance of ay display computing device of the plurality of display computing devices while the content associated with the identifier was being displayed on such display computing device, and wherein the viewing threshold distance is less than the proximity threshold distance;
incrementing, by the mobile device and in response to a determination that the current content is being displayed by the first display computing device at the time the mobile device moved from the location beyond to the location within the viewing threshold distance of the first display computing device, a view count for the identifier corresponding to the indicator by one additional count;
transmitting, by the mobile device, based on the received portfolio list, a bid request to the first display computing device, the bid request indicating the view count for each of the plurality of identifiers, including the incremented view count for the identifier corresponding to the indicator representing the current content; and
wherein the first display computing device does not track and store a physical location of an individual user of the mobile device.

5. The method of claim 4, further comprising
receiving an indication of a user topic of interest, wherein the bid request indicates the user topic of interest.

6. The method of claim 4, wherein the determining a user viewing history of a content comprises:
querying a user viewed content database, wherein the user viewed content database comprises each identifier for each content displayed on any display computing device of the plurality of display computing devices while the mobile phone was detected to have moved from a location beyond to a location within a viewing threshold distance of such display computing device of the plurality of display computing devices.

7. The method of claim 4, further comprising
receiving, by the mobile device, a response from the first display computing device, the response comprising an identifier representing the content on display when the bid request was received at the first display computing device.

8. The method of claim 7, further comprising:
transmitting a second bid request to the first display computing device, the second bid request indicating the view count for the displayed content.

9. The storage medium of claim 1, further comprising:
instructions to detect movement of the mobile device; and
instructions to monitor proximity during detected movement of the mobile device.

10. The storage medium of claim 9, further comprising:
instructions to discontinue proximity monitoring upon determining that a predetermined period of time has elapsed with no detected movement of the mobile device.

11. The storage medium of claim 1, further comprising:
instructions to determine when a predefined time period has elapsed since the probing request was transmitted; and
instructions to transmit, responsive to the determination that the predefined time period has elapsed since the probing request was transmitted, a second probing request.

12. The storage medium of claim 1, further comprising:
instructions to determine when a predefined time period has elapsed since the bid request was transmitted; and
instructions to transmit, responsive to the determination that the predefined time period has elapsed since the bid request was transmitted, a second bid request.

13. The method of claim 4, further comprising:
detecting movement of the mobile device; and
monitoring proximity during detected movement of the mobile device.

14. The method of claim 13, further comprising:
discontinuing proximity monitoring upon determining that a predetermined period of time has elapsed with no detected movement of the mobile device.

15. The method of claim 4, further comprising:
determining when a predefined time period has elapsed since the probing request was transmitted; and
sending, responsive to the determination that the predefined time period has elapsed since the probing request was sent, a second probing request.

16. The storage medium of claim 1, further comprising:
determining when a predefined time period has elapsed since the bid request was transmitted; and
transmitting, responsive to the determination that the predefined time period has elapsed since the bid request was transmitted, a second bid request.

* * * * *